No. 760,352. PATENTED MAY 17, 1904.
J. SNYDER.
TIRE.
APPLICATION FILED AUG. 21, 1903.
NO MODEL.
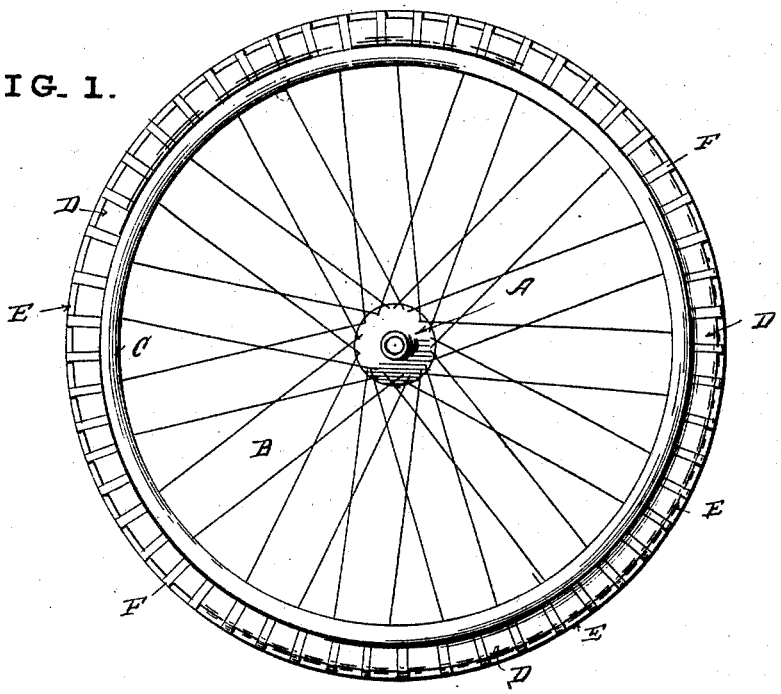
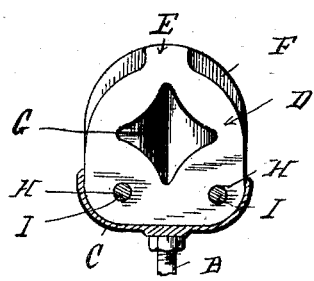
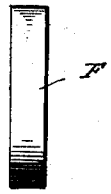
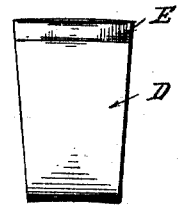
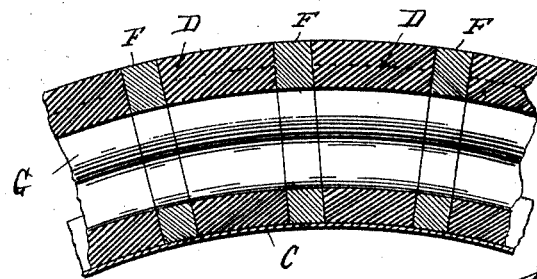

No. 760,352. Patented May 17, 1904.

UNITED STATES PATENT OFFICE.

JOHN SNYDER, OF SNYDERVILLE, OHIO.

TIRE.

SPECIFICATION forming part of Letters Patent No. 760,352, dated May 17, 1904.

Application filed August 21, 1903. Serial No. 170,328. (No model.)

*To all whom it may concern:*

Be it known that I, JOHN SNYDER, a citizen of the United States, residing at Snyderville, in the county of Clark and State of Ohio, have invented certain new and useful Improvements in Tires, of which the following is a specification.

My invention relates to improvements in tires, and refers particularly to what are known as "cushion-tires," the object of my invention being the provision of a tire for use upon cycles or vehicles which will have the desired resiliency, which will be very durable and long-lasting, and which will be generally efficient and practical.

With this object in view my invention consists of a tire embodying novel features of construction and combination of parts, substantially as disclosed herein.

Figure 1 represents a side elevation of a wheel provided or equipped with my tire complete. Fig. 2 represents a transverse sectional view through the tire or felly or rim of the wheel. Fig. 3 represents an edge view of one of the hide rings. Fig. 4 represents a similar view of one of the elastic or rubber rings, and Fig. 5 represents a longitudinal sectional view of a portion of the tire.

Referring by letter to the drawings, the letter A designates the hub, B the spokes, and C the rim of the wheel, the rim being of the grooved or channeled form to receive my improved tire.

The tire proper is composed of a series of tapering rubber or elastic rings D, which have their lower edges fitting in the rim and their upper edges reduced or flanged at E to form the thread, and between the said rings I place the series of horse-hide rings F, the rubber and horse-hide rings or sections thus fitting snugly together, as clearly shown in Figs. 1 and 5, and each being provided with the central opening or passage G and with the pairs of openings H, through which openings H pass the binding and securing wires or rods J, the whole forming a compact structure which while having the proper elasticity will produce a tire which can be easily repaired, which will last a long time, and which can be produced at a comparatively low cost, all things considered.

I claim—

The tire herein described consisting of the series of tapering or wedge-shaped elastic sections having the central passage and the pair of lower openings and formed with the central reduced tread portion, the series of rawhide flat-faced rings interposed between the wedge-shaped elastic sections and having their upper edge in line with the reduced tread portion of the elastic sections and the binding wires or rods passing through the pair of lower openings for securing the sections to form a complete tire.

In testimony whereof I affix my signature in presence of two witnesses.

JOHN SNYDER.

Witnesses:
HORACE C. KEEFER,
HARRY G. R. GRAM.